United States Patent
Kim et al.

(10) Patent No.: US 8,355,385 B2
(45) Date of Patent: Jan. 15, 2013

(54) APPARATUS AND METHOD FOR MANAGING RESOURCE TO DECREASE INTER-CELL INTERFERENCE IN A BROADBAND WIRELESS COMMUNICATION SYSTEM

(75) Inventors: Eun-Young Kim, Hwaseong-si (KR); Tak-Ki Yu, Yongin-si (KR); Eun-Seok Ko, Seongnam-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 333 days.

(21) Appl. No.: 12/823,471

(22) Filed: Jun. 25, 2010

(65) Prior Publication Data
US 2011/0002285 A1  Jan. 6, 2011

(30) Foreign Application Priority Data
Jul. 2, 2009 (KR) .................. 10-2009-0060119

(51) Int. Cl.
*H04W 4/00* (2009.01)

(52) U.S. Cl. ........................... 370/332; 370/310

(58) Field of Classification Search .................. 370/310, 370/310.2, 328, 332, 341
See application file for complete search history.

(56) References Cited

U.S. PATENT DOCUMENTS

| | | | | |
|---|---|---|---|---|
| 6,996,127 | B2 * | 2/2006 | Rezaiifar et al. | 370/468 |
| 7,317,897 | B2 * | 1/2008 | Braun et al. | 455/63.1 |
| 7,853,292 | B2 * | 12/2010 | Chang et al. | 455/561 |
| 8,126,403 | B2 * | 2/2012 | Wang Helmersson et al. | 455/63.1 |
| 8,145,252 | B2 * | 3/2012 | Sung et al. | 455/522 |

* cited by examiner

*Primary Examiner* — Brenda H Pham
(74) *Attorney, Agent, or Firm* — Jefferson IP Law, LLP (57) ABSTRACT

An apparatus and method for resource management in a wireless communication system are provided. The method includes allocating resources and transmit power to maximize Quality of Service (QoS) satisfaction of User Equipments (UEs) and a sum rate using long-term channel information of the UEs, determining a transmit power constraint per resource block using a power distribution of the resources and transmit power allocation results and control information of at least one neighboring BS, and allocating resource and transmit power to maximize the QoS satisfaction of the UEs and the sum rate using short-term channel information of the UEs under a condition of the transmit power constraint.

22 Claims, 6 Drawing Sheets

| | RESULTS PER STEP OF BS A | RESULTS PER STEP OF BS B |
|---|---|---|
| 1ST STEP (110) | {5, 5, 5, 4, 4, 3, 3, 3, 3, 1} | {5, 5, 5, 3, 3, 3, 3, 3, 2, 1} |

2ND STEP (120):

$$\mu_A = \begin{bmatrix} 0 \\ 0 \\ 0 \\ 0 \\ 0 \\ 1 \\ 1 \\ 1 \\ 1 \\ 1 \end{bmatrix} \begin{matrix} \leq 3 \\ \leq 3 \\ \leq 3 \\ \leq 3 \\ \leq 1 \\ \leq 5 \\ \leq 5 \\ \leq 5 \\ \leq 4 \\ \leq 4 \end{matrix}$$

$$\mu_B = \begin{bmatrix} 1 \\ 1 \\ 1 \\ 0 \\ 0 \\ 0 \\ 0 \\ 0 \\ 0 \\ 0 \end{bmatrix} \begin{matrix} \leq 5 \\ \leq 5 \\ \leq 5 \\ \leq 3 \\ \leq 3 \\ \leq 3 \\ \leq 3 \\ \leq 3 \\ \leq 1 \\ \leq 2 \end{matrix}$$

3RD STEP (130):

APPARATUS AND METHOD FOR MANAGING RESOURCE TO DECREASE INTER-CELL INTERFERENCE IN A BROADBAND WIRELESS COMMUNICATION SYSTEM

PRIORITY

The present application claims the benefit under 35 U.S.C. §119(a) of a Korean patent application filed in the Korean Intellectual Property Office on Jul. 2, 2009, and assigned Serial No. 10-2009-0060119, the entire disclosure of which is hereby incorporated by reference.

BACKGROUND OF THE INVENTION

1. Field of the Invention

The present invention relates generally to a broadband wireless communication system. More particularly, the present invention relates to an apparatus and a method for mitigating inter-cell interference in a broadband wireless communication system.

2. Description of the Related Art

A conventional wireless communication system performs resource allocation and power control based on a single cell without considering inter-cell interference. For doing so, a concept of network utility is introduced as an object function of the entire system. The network utility is a function considering not only the system throughput but also the fairness, and, for example, is given by Equation 1.

$$U(R_m) = \begin{cases} \frac{1}{1-\alpha} R_m^{1-\alpha}, & \text{if } \alpha > 0, \alpha \neq 1 \\ \log R_m, & \text{if } \alpha = 1 \end{cases} \quad [\text{Eqn. 1}]$$

In Equation 1, $U(R_m)$ denotes the network utility of a User Equipment (UE) m, $R_m$ denotes a data rate of the UE m, and $\alpha$ denotes a fairness regulation factor.

By maximizing the sum of the network utilities of a plurality of UEs, the system throughput is maximized. In that regard, the determination of a network utility vector to maximize the sum of the network utilities is referred to as Network Utility Maximization (NUM).

While the system throughput can be optimized by determining the NUM, this solution merely takes account of the single-cell environment. In a multi-cell environment, a UE traveling in the cell boundary suffers from communication interruption caused by interference of a neighboring cell, and the performance expected based on the result of the NUM is not attained. Thus, a NUM scheme based on the multi-cell environment is considered. However, a method for determining an optimum solution in a multi-cell environment is not yet known, and the solution, if any, will require very complicated computations. Moreover, to address the NUM scheme based on the multi-cell environment, it is necessary to share channel information between Base Stations (BSs) managing respective cells and UEs, which demands considerable control overhead. In this regard, there is a need for a method for addressing the NUM scheme considering the multi-cell environment, to lower the computational complexity, and to minimize the control overhead.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for maximizing system throughput by taking into account a multi-cell environment in a broadband wireless communication system.

Another aspect of the present invention is to provide an apparatus and a method for managing resources to decrease inter-cell interference in a broadband wireless communication system.

Yet another aspect of the present invention is to provide an apparatus and a method for minimizing computational complexity to suppress inter-cell interference through computations distributed over base stations in a broadband wireless communication system.

Still another aspect of the present invention is to provide an apparatus and a method for determining transmit power constraint per resource block using Relative Narrowband Transmit Power (RNTP) information in a broadband wireless communication system.

A further aspect of the present invention is to provide an apparatus and a method for predicting a transmit power per resource block of each cell using RNTP information in a broadband wireless communication system.

A further aspect of the present invention is to provide an apparatus and a method for determining interference indices indicating the sum of interference from neighboring cells and interference to the neighboring cells in a broadband wireless communication system.

In accordance with an aspect of the present invention, a resource managing method of a Base Station (BS) in a wireless communication system is provided. The method includes allocating resources and transmit power to maximize Quality of Service (QoS) satisfaction of User Equipments (UEs) and a sum rate using long-term channel information of the UEs, determining a transmit power constraint per resource block using a power distribution of the resources and transmit power allocation results and control information of at least one neighboring BS, and allocating resources and transmit power to maximize the QoS satisfaction of the UEs and the sum rate using short-term channel information of the UEs under a condition of the transmit power constraint.

In accordance with another aspect of the present invention, an apparatus of a BS in a wireless communication system is provided. The apparatus includes a UE manager for storing long-term channel information and short-term channel information of UEs, and a controller for allocating resources and transmit power to maximize QoS satisfaction of the UEs and a sum rate using the long-term channel information of the UEs, determining a transmit power constraint per resource block using a power distribution of the resources and transmit power allocation results and control information of at least one neighboring BS, and allocating resources and transmit power to maximize the QoS satisfaction of the UEs and the sum rate using the short-term channel information of the UEs under a condition of the transmit power constraint.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a resource management technique for mitigating inter-cell interference in a broadband wireless communication system. Hereinafter, a wireless communication system employing Orthogonal Frequency Division Multiplexing (OFDM)/Orthogonal Frequency Division Multiple Access (OFDMA) is used to exemplify the present invention. However, it is to be understood that the present invention is equally applicable to other wireless communication systems.

In a system according to an exemplary embodiment of the present invention, Base Stations (BSs) exchange control information of Table 1 through a backhaul.

TABLE 1

| Parameter | Bit-width |
| --- | --- |
| RNTP($n_{PRB}$): indicator bitmap | $N_{RB}^{DL}$ |
| RNTP$_{threshold}$ ∈ {−∞, −11, −10, −9, −8, −7, −6, −5, −4, −3, −2, −1, 0, +1, +2, +3} | 4 |
| Number of cell-specific antenna ports, $N_{TX}$ ∈ {1, 2, 4} | 2 |
| RS power bosting, $P_B$ | 2 |
| Predicted number of occupied PDCCH OFDM symbols, C ∈ {1, 2, 3} | 2 |

In Table 1, $N_{RB}^{DL}$ denotes the total number of resource blocks of the downlink. The indicator bitmap in the control information of Table 1 indicates whether a downlink transmit power of each resource block is greater than Relative Narrowband Transmit Power RNTP$_{threshold}$. The control information of Table 1 is substantially identical to RNTP defined by the 3$^{rd}$ Generation Partnership Project (3GPP) Long Term Evolution (LTE) standard and can be referred to using various other terms depending on the intention of the practitioner. Accordingly, it is to be understood that the present invention is equally applicable to systems other than a 3GPP LTE system.

Exemplary embodiments of the present invention address i) single-cell OFDMA Network Utility Maximization (NUM) on the assumption that there is no inter-cell interference in each cell, and ii) NUM considering a multi-cell environment by addressing two sub-problems such as minimization of adverse effect from inter-cell interference per cell.

Figure 1:
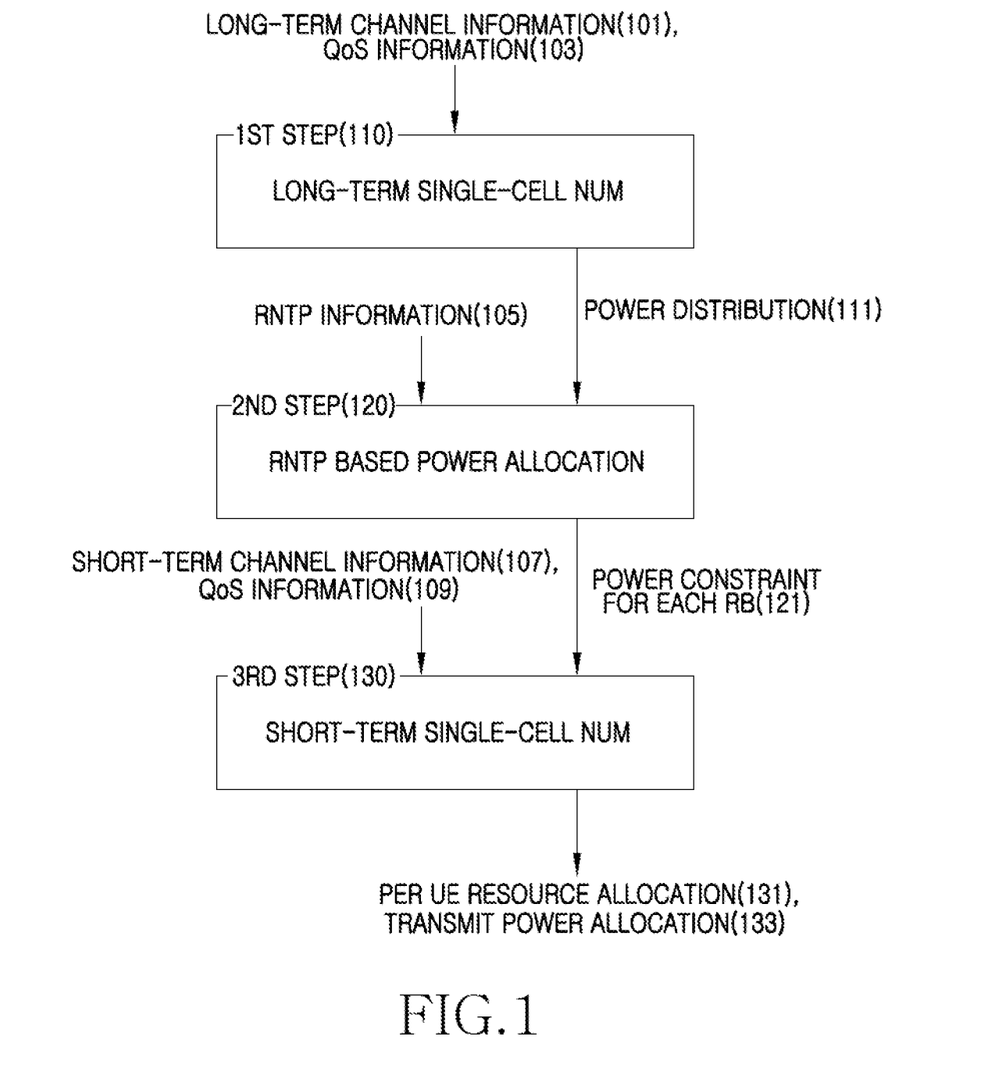
FIG. 1 illustrates a three-step procedure for allocating resources and power in a broadband wireless communication system according to an exemplary embodiment of the present invention.

FIG. 1 illustrates a three-step procedure for allocating resources and power in a broadband wireless communication system according to an exemplary embodiment of the present invention.

More specifically and with reference to FIG. 1, a brief explanation of necessary input and output information for each step of an exemplary process for allocating resources and power in a broadband wireless communication system is provided. The steps are individually performed per cell, and it is assumed that the RNTP information is shared among the cells. That is, the BS of a reference cell has access to RNTP information most recently received from neighboring cells and sends RNTP information of the reference cell to the neighboring cells.

Referring to FIG. 1, a first step 110 includes a single-cell NUM process based on the long term. In the first step 110, using long-term channel gain information 101 and Quality of Service (QoS) information 103 of its User Equipments (UEs), the reference cell addresses the single-cell OFDMA NUM either without considering the inter-cell interference or by treating the inter-cell interference as white noise. Since the long-term channel gain is not affected by frequency selective fading, the problem is addressed using the same long-term channel gain information 101 with respect to each resource block. Thus, the first step 110 yields the resource and power allocation results independent of the resource block. For example, the resource and power allocation results for maximizing the network utility of the single cell are attained under given power constraints. Among the results, the resource allocation, that is, the mapping relation of a particular UE and the resource block, is discarded and only the power allocation result 111 is provided as the output of the first step 110. As stated above, since the power allocation result has nothing to do with resource block indices, the power allocation result 111 corresponding to all of the resource blocks, rather than the power allocation information per resource block, is drawn in no particular order. Hereafter, the power allocation information without order is referred to as power distribution 111.

For instance, when the transmit power per resource block is one of 1, 2, 3, 4 and 5 and the number of the resource blocks is 10, the output of the first step 110 includes ten transmit power values. In short, the first step 110 determines the power distribution which maximizes the network utility of the reference cell on the long-term basis without taking account of the inter-cell interference.

The second step 120 is the power allocation process based on the RNTP information including at least one of the parameters of Table 1. Under a condition that the power distribution 111 of the reference cell acquired in the first step 110 is satisfied, the second step 120 maps the power to the resource blocks to reduce the inter-cell interference. For doing so, RNTP information 105 provided from the neighboring cells is used. For example, when the reference cell determines that the bitmap value of a particular resource block is 1 based on the RNTP information 105 of the neighboring cells, which implies that the corresponding neighboring cell is highly likely to use a high level of transmit power in the resource block, it is preferable that the reference cell allocate the corresponding resource block to a UE traveling within the cell so as to use low transmit power. When the resource block is allocated to a UE traveling in the cell boundary so as to require use of the high transmit power, the UE of the reference cell is greatly affected by the inter-cell interference and exerts the high inter-cell interference on UEs of the neighboring cell. Additional details of the second step 120 are provided below. The resource block based power constraint 121 determined in the second step 120 is converted to RNTP information and transferred to the neighboring cells over the backhaul network. In short, the second step 120 allocates the transmit power per resource block and sends the RNTP to the neighboring cells.

A third step 130 includes a single-cell NUM process on the short-term basis. In the third step 130, the reference cell applies the resource block based power constraint 121 determined in the second step 120 as an upper limit condition, and addresses the problem of maximizing the network utility by considering the short-term channel gain 107 and the QoS 109 of the UEs of the reference cell by scheduling periods. Yet, while it is assumed that the inter-cell interference is controlled sufficiently through the power allocation of the second step 120, and the inter-cell interference is not considered or is treated as white noise as in the first step 110, the third step 130 conforms to substantially the same manner as the conventional single-cell OFDMA NUM. Through the third step 130, the resource allocation 131 and the transmit power allocation 133 per UE to apply to the actual scheduling are accomplished. That is, the third step 130 determines which resource block is allocated to which UE, and how much transmit power is used in each resource block.

Figure 2A:
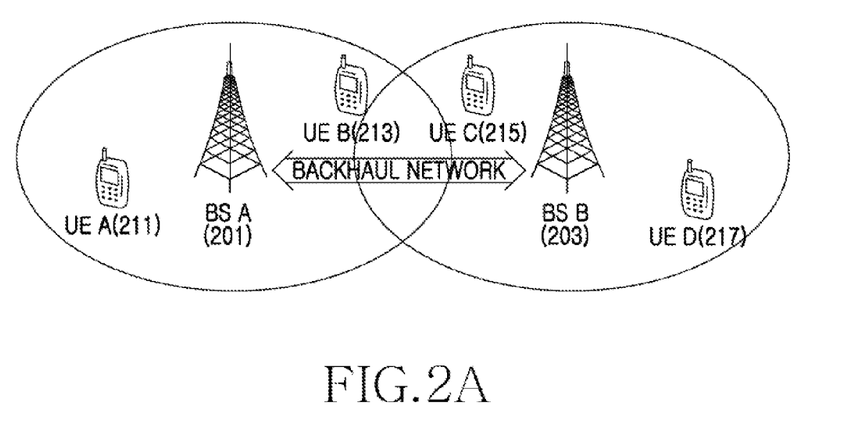
FIG. 2A illustrates a cell relation in a broadband wireless communication system according to an exemplary embodiment of the present invention.
Figure 2B:
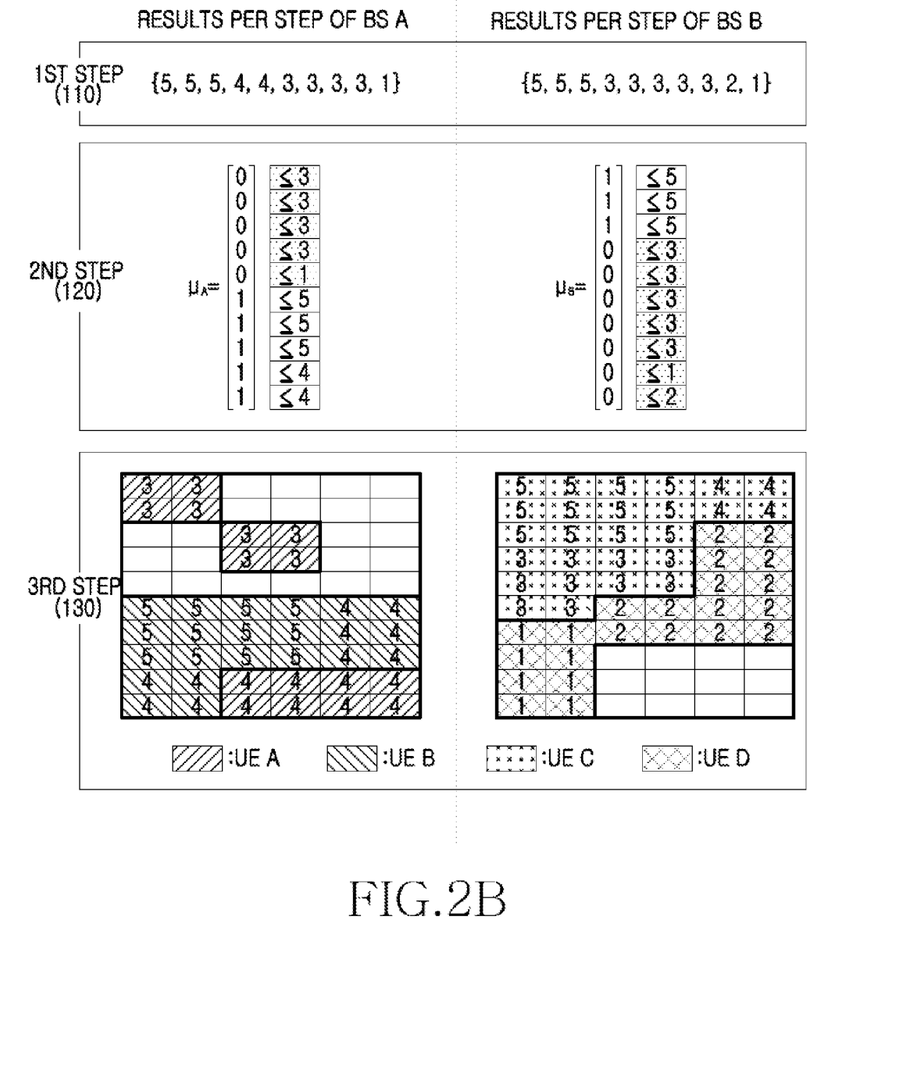
FIG. 2B illustrates results of a three-step procedure for resources and power allocation in a broadband wireless communication system according to an exemplary embodiment of the present invention.

FIG. 2A illustrates a cell relation in a broadband wireless communication system according to an exemplary embodiment of the present invention. FIG. 2B illustrates results of a three-step procedure for resource and power allocation in a broadband wireless communication system according to an exemplary embodiment of the present invention.

Referring to the two-cell environment of FIG. 2A, the steps of FIG. 1 are explained in more detail. A UE A 211 and a UE B 213 are connected to a BS A 201, and a UE C 215 and a UE D 217 are connected to a BS B 203. To facilitate the understanding, the BS of the reference cell conducting the steps is referred to as a $BS_0$, the i-th neighboring BS is referred to as a $BS_i$, the m-th UE connected to the BS of the reference cell is referred to as a $UE^m{}_0$, and the m-th UE connected to the i-th neighboring BS is referred to as a $UE^m{}_i$. Accordingly, when the BS A 201 is $BS_0$, the BS B 203 is $BS_i$ and when the BS B 203 is $BS_0$, the BS A 201 is $BS_i$.

In the first step, each of the BS A 201 and the BS B 203 addresses the single-cell OFDMA NUM using the long-term channel information and the QoS based on Equation 2 without considering the inter-cell interference.

$$\text{Maximize} \sum_{m=1}^{M} \left[ U'(R_{t,opt}) \sum_{k} \left\{ \frac{B}{K} \log_2 \left( 1 + \frac{G_{m0} P_0^k}{N_0} \right) x_m^k \right\} \right] \quad [\text{Eqn. 2}]$$

$$\sum_{k} P_0^k \leq P_{total}$$

$$P_0^k \geq 0$$

Subject to $$\sum_{m=1}^{M} x_m^k \leq 1$$

$$x_m^k \in \{0, 1\}$$

In Equation 2, M denotes the total number of UEs connected to the BS, $U'(R_{t,opt})$ denotes a differential function of the network utility including an optimum data rate vector at a time t, B denotes a bandwidth, K denotes the number of resource blocks, $G_{m0}$ denotes a long-term channel gain between the BS and the $UE^m{}_0$, $P_0^k$ denotes the transmit power of the BS for the k-th resource block, $x_m^k$, which indicates whether the k-th resource block is allocated to the $UE^m{}_0$, denotes a variable that is set to 1 when the k-th resource block is allocated and to 0 when the k-th resource block is not allocated, and $P_{total}$ denotes the total transmit power of the BS.

By addressing the single-cell OFDMA NUM based on Equation 2, the BS A 201 and the BS B 203 obtain the power distribution. For example, the power distribution of the BS A 201 is {5, 5, 5, 4, 4, 3, 3, 3, 3, 1} and the power distribution of the BS B 203 is {5, 5, 5, 3, 3, 3, 3, 3, 2, 1} as shown in FIG. 2B. Using the power distribution, the second step is executed.

The second step is to use the RNTP information of the neighboring cells to mitigate the inter-cell interference in the detailed allocation of the power distribution acquired in the first step to the resource blocks. An explicit purpose of the second step is to maximize the data sum rate of the entire multi-cell network. In the process of the second step, it is assumed that i) the transmit power is inversely proportional to the channel gain of the UE at the long-term view, ii) serious inter-cell interference does not occur unless the neighboring cell interferes with the reference cell, and iii) the neighboring cell uses the highest level of transmit power possible.

When receiving the RNTP information from the $BS_i$, the $BS_0$ predicts the transmit power of the neighboring BS based on Equation 3 on the third assumption that the neighboring cell uses the highest level of transmit power possible. That is, the BS A 201 and the BS B 203 predict the mutual transmit power based on Equation 3.

$$P_i = P_{max} \cdot \mu_i + P_{th,i} \cdot (1 - \mu_i) \quad [\text{Eqn. 3}]$$

In Equation 3, $P_i$ denotes a vector indicating the power transmit prediction values per resource block of the $BS_i$, $\mu_i$ denotes an RNTP indicator bitmap of the $BS_i$, and $P_{th,i}$, which is the maximum transmit power of the $BS_i$ allowed when the RNTP indicator is 1, denotes an RNTP threshold of the $BS_i$.

Figure 3:
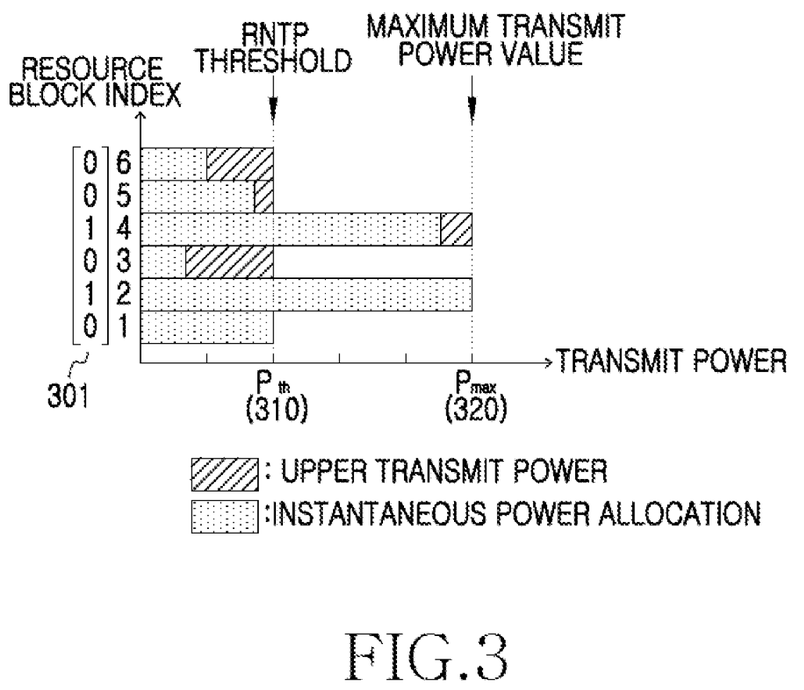
FIG. 3 illustrates a transmit power prediction value of a neighboring cell in a broadband wireless communication system according to an exemplary embodiment of the present invention.

FIG. 3 illustrates a transmit power prediction value of a neighboring cell in a broadband wireless communication system according to an exemplary embodiment of the present invention.

Referring to FIG. 3, when the actual instantaneous power allocation of the neighbor BS of FIG. 3 is given, the RNTP indicator bitmap 301 is [0 0 1 0 1 0]. The $BS_0$ receives the RNTP indicator bitmap 301, recognizes, based on the RNTP indicator bitmap 301, that the transmit power lower than the RNTP threshold is used for the resource blocks of the indices 1, 3, 5 and 6, and recognizes that the transmit power higher than the RNTP threshold is used for the resource blocks of the indices 2 and 4. Hence, the $BS_0$ predicts the transmit power for the resource blocks of the indices 1, 3, 5 and 6 as $P_{th}$ 310 which is the RNTP threshold, and predicts the transmit power for the resource blocks of the indices 2 and 4 as $P_{max}$ 320 which is the maximum transmit power value.

After predicting the resource block based transmit power of the $BS_i$, the $BS_0$ determines a network-wide sum rate. That is, the BS A 201 and the BS B 203 determine their network-wide sum rate.

Provided that the $BS_0$ allocates a particular resource block to the $UE^m{}_0$ and the $BS_i$ also allocates the particular resource block to the $UE^m{}_1$, a long-term Signal to Interference and Noise Ratio (SINR) of the $UE^m{}_0$ for the particular resource block is given by Equation 4.

$$SINR_0^k = \frac{w_0 G_{00}^{m(k)} P_0^k}{N_0 + \sum_{i \neq 0} w_i G_{0i}^{m(k)} P_i^k} \qquad [\text{Eqn. 4}]$$

In Equation 4, $SINR_0^k$ denotes an SINR for the k-th resource block of the reference cell, $w_0$ denotes an impact factor of the reference cell, $G_{00}^m$ denotes the long-term channel gain between the $BS_0$ and the $UE^m{}_0$ of the reference cell, $P_0^k$ denotes the transmit power of the $BS_0$ for the k-th resource block, $N_0$ denotes a noise power of the reference cell, $w_i$ denotes an impact factor of the $BS_i$, $G_{0i}^{m(k)}$ denotes the long-term channel gain between the $BS_i$ and the $UE^m{}_0$, and $P_i^k$ denotes the transmit power of the $BS_i$ for the k-th resource block.

The long-term SINR of the $UE^m{}_i$ for the particular resource block is given by Equation 5.

$$SINR_i^k = \frac{w_i G_{ii}^{m(k)} P_i^k}{I_i + w_0 G_{i0}^{m(k)} P_0^k}, \quad \forall i \neq 0 \qquad [\text{Eqn. 5}]$$

In Equation 5, $SINR_i^k$ denotes the SINR for the k-th resource block of the i-th neighboring cell, $w_i$ denotes the impact factor of the $BS_i$, $G_{ii}^m$ denotes the long-term channel gain between the $BS_i$ and the $UE^m{}_i$, $P_i^k$ denotes the transmit power of the $BS_i$ for the k-th resource block, $I_i$ denotes the sum of noise power of the i-th neighboring cell and noise powers of the cells other than the reference cell, $w_0$ denotes the impact factor of the reference cell, $G_{i0}^{m(k)}$ denotes the long-term channel gain between the $BS_0$ and the $UE^m{}_i$, and $P_0^k$ denotes the transmit power of the $BS_0$ for the k-th resource block.

Based on Equation 4 and Equation 5, the network-side sum rate is expressed as Equation 6.

$$\begin{aligned}
C_0 &= \sum_k \left\{ \log_2(1 + SINR_0^k) + \sum_{i \neq 0} \log_2(1 + SINR_i^k) \right\} \\
&= \sum_k \left\{ \log_2\left(1 + \frac{w_0 G_{00}^{m(k)} P_0^k}{N_0 + \sum_{i \neq 0} w_i G_{0i}^{m(k)} P_i^k}\right) + \sum_{i \neq 0} \log_2\left(1 + \frac{w_i G_{ii}^{m(k)} P_i^k}{I_i + w_0 G_{i0}^{m(k)} P_0^k}\right) \right\} \\
&\approx \log_2 \prod_k \left\{ \frac{\left(w_0 G_{00}^{m(k)} P_0^k\right) \prod_{i \neq 0} \left(w_i G_{ii}^{m(k)} P_i^k\right)}{\left(N_0 + \sum_{i \neq 0} w_i G_{0i}^{m(k)} P_i^k\right) \prod_{i \neq 0} \left(I_i + w_0 G_{i0}^{m(k)} P_0^k\right)} \right\}
\end{aligned} \qquad [\text{Eqn. 6}]$$

In Equation 6, $C_0$ denotes the network-wide sum rate, $SINR_0^k$ denotes the SINR for the k-th resource block of the reference cell, $SINR_i^k$ denotes the SINR for the k-th resource block of the i-th neighboring cell, $w_0$ denotes the impact factor of the reference cell, $G_{00}^m$ denotes the long-term channel gain between the $BS_0$ and the $UE^m{}_0$, $P_0^k$ denotes the transmit power of the $BS_0$ for the k-th resource block, $N_0$ denotes a noise power of the reference cell, $w_i$ denotes the impact factor of the $BS_i$, $G_{0i}^m$ denotes the long-term channel gain between the $BS_i$ and the $UE^m{}_0$, $P_i^k$ denotes the transmit power of the $BS_i$ for the k-th resource block, $G_{ii}^{m(k)}$ denotes the long-term channel gain between the $BS_i$ and the $UE^m{}_i$, $I_i$ denotes the sum of the noise power of the i-th reference cell and the noise powers from the cells other than the reference cell, and $G_{i0}^{m(k)}$ denotes the long-term channel gain between the $BS_0$ and the $UE^m{}_i$.

To determine the network-wide sum rate based on Equation 6, the $BS_0$ needs to estimate the long-term channel gain between the $BS_0$ and the $UE^m{}_0$, the long-term channel gain between the $BS_i$ and the $UE^m{}_i$, the long-term channel gain between the $BS_0$ and the $UE^m{}_i$, and the long-term channel gain between the $BS_i$ and the $UE^m{}_0$.

According to the assumption that the transmit power is inversely proportional to the channel gain of the UE in the long term, the $BS_0$ estimates the long-term channel gain between the $BS_0$ and the $UE^m{}_0$, and the long-term channel gain between the $BS_i$ and the $UE^m{}_i$ based on Equation 7.

$$P_i^k \cdot G_{ii}^m(k) = c_i \qquad [\text{Eqn. 7}]$$

In Equation 7, $P_i^k$ denotes the transmit power of the $BS_i$ for the k-th resource block, $G_{ii}^m$ denotes the long-term channel gain between the $BS_i$ and the $UE^m{}_i$, and $c_i$ denotes a target signal strength of the i-th neighboring cell.

The long-term channel gain between the $BS_0$ and the $UE^m{}_i$ and the long-term channel gain between the $BS_i$ and the $UE^m{}_0$ are estimated using geometric information of the BS and the UE. That is, the estimation of the long-term channel gain for the interference channel is carried out by utilizing a channel model based on a distance between the BS and the BS and a distance between the BS and the UE. The long-term channel gain between the $BS_i$ and the $UE^m{}_0$ is estimated based on Equation 8.

$$\begin{aligned}
G_{00}^{m(k)} &= c_0 \cdot P_0^{k-1} = \beta \cdot d^{-\alpha} \\
G_{0i}^{m(k)} &= \beta \cdot (D_{0-i} - d)^{-\alpha} \\
&= \beta \cdot \left(D_{0-i} - (\beta/c_0 \cdot P_0^k)^{\frac{1}{\alpha}}\right)^{-\alpha}
\end{aligned} \qquad [\text{Eqn. 8}]$$

In Equation 8, $G_{00}^m$ denotes the long-term channel gain between the $BS_0$ and the $UE^m{}_0$, $c_0$ denotes the target signal strength of the reference cell, $P_0^k$ denotes the transmit power of the $BS_0$ for the k-th resource block, d denotes the distance between the $BS_0$ and the UE, $\alpha$ and $\beta$, which are derived using one of well-known channel models, denote a path loss index and an initial value respectively, $G_{0i}^{m(k)}$ denotes the long-term channel gain between the $BS_i$ and the $UE^m{}_0$, and $D_{0-i}$ denotes the distance between the $BS_0$ and the $BS_i$.

The long-term channel gain between the $BS_0$ and the $UE^m{}_i$ is given by Equation 9.

$$G_{ii}^{m(k)} = c_i \cdot P_i^{k-1} = \beta \cdot d^{-\alpha} \qquad \text{[Eqn. 9]}$$

$$G_{i0}^{m(k)} = \beta \cdot (D_{i-0} - d)^{-\alpha}$$

$$= \beta \cdot \left(D_{i-0} - (\beta/c_i \cdot P_i^k)^{\frac{1}{\alpha}}\right)^{-\alpha}$$

In Equation 9, $G_{ii}^m$ denotes the long-term channel gain between the $BS_i$ and the $UE^m{}_i$, $c_i$ denotes the target signal strength of the i-th neighboring cell, $P_i^k$ denotes the transmit power of the BS, for the k-th resource block, $\alpha$ and $\beta$, which are derived using one of well-known channel models, denote the path loss index and the initial value respectively, $G_{i0}^{m(k)}$ denotes the long-term channel gain between the $BS_0$ and the $UE^m{}_i$, and $D_{i-0}$ denotes the distance between the $BS_i$ and the $BS_0$.

The formulas for the long-term channel gain in Equation 8 and Equation 9 are expressed as the exponential product, and accordingly their computational complexity is high. To decrease the computational complexity, the long-term channel gain formulas are substituted by approximated linear functions as expressed in Equation 10.

$$G_{0i}^{m(k)} = \beta \cdot \left(D_{0-i} - (\beta/c_0 \cdot P_0^k)^{\frac{1}{\alpha}}\right)^{-\alpha} \approx a_{0i} P_0^k + b_{oi} \qquad \text{[Eqn. 10]}$$

$$G_{i0}^{m(k)} = \beta \cdot \left(D_{i-0} - (\beta/c_i \cdot P_i^k)^{\frac{1}{\alpha}}\right)^{-\alpha} \approx a_{i0} P_i^k + b_{io}$$

In Equation 10, $G_{0i}^{m(k)}$ denotes the long-term channel gain between the BS, and the $UE^m{}_0$, $D_{0-i}$ denotes the distance between the $BS_0$ and the $BS_i$, $c_0$ denotes the target signal strength of the reference cell, $P_0^k$ denotes the transmit power of the $BS_0$ for the k-th resource block, d denotes the distance between the $BS_0$ and the UE, $\alpha$ and $\beta$, which are derived using one of the well-known channel models, denote the path loss index and the initial value respectively, $a_{0i}$ and $b_{oi}$, which are constants indicating characteristics of the linear approximate function of the long-term channel gain based on the transmit power between the UE of the reference cell and the $BS_i$, denote a slope and a y-intercept of the linear approximate function, $G_{i0}^{m(k)}$ denotes the long-term channel gain between the $BS_0$ and the $UE^m{}_i$, $D_{i-0}$ denotes the distance between the $BS_i$ and the $BS_o$, $c_i$ denotes the target signal strength of the i-th neighboring cell, $P_i^k$ denotes the transmit power of the $BS_i$ for the k-th resource block, and $a_{i0}$ and $b_{i0}$, which are constants indicating characteristics of a linear approximate function of the long-term channel gain based on the transmit power between the $UE^m{}_i$ and the $BS_0$, denote a slope and a y-intercept of the linear approximate function.

When Equation 7 and Equation 10 are substituted for Equation 6, the network-wide sum rate is given by Equation 11.

$$C_0 \approx \log_2 \frac{\prod_k \left\{(w_0 c_0) \prod_{i \neq 0} (w_i c_i)\right\}}{\prod_k \left\{\begin{array}{l}(N_0 + \sum_{i \neq 0} w_i(a_{0i}P_0^k + b_{0i})P_i^k) \\ \prod_{i \neq 0}(I_i + w_0(a_{i0}P_i^k + b_{i0})P_0^k)\end{array}\right\}} \qquad \text{[Eqn. 11]}$$

In Equation 11, $C_0$ denotes the network-wide sum rate, $w_0$ denotes the impact factor of the reference cell, $c_0$ denotes the target signal strength of the reference cell, $w_i$ denotes the impact factor of the $BS_i$, $c_i$ denotes the target signal strength of the i-th neighboring cell, $N_0$ denotes the noise power of the reference cell, $P_0^k$ denotes the transmit power of the $BS_0$ for the k-th resource block, $P_i^k$ denotes the transmit power of the $BS_i$ for the k-th resource block, $I_i$ denotes the sum of noise power of the i-th neighboring cell and noise powers of the cells other than the reference cell, $a_{0i}$ and $b_{oi}$, which are constants indicating characteristics of the linear approximate function of the long-term channel gain based on the transmit power between the UE of the reference cell and the $BS_i$, denote the slope and the y-intercept of the linear approximate function, and $a_{i0}$ and $b_{i0}$, which are constants indicating characteristics of a linear approximate function of the long-term channel gain based on the transmit power between the $UE^m{}_i$ and the $BS_0$, denote the slope and the y-intercept of the linear approximate function.

That is, by substituting the power distribution acquired in the first step into Equation 11, the power allocation which maximizes the result of Equation 11 is found. Thus, the resource block based transmit power for maximizing the network-wide sum rate is determined. Since the substitution of every possible case is very complicated, the problem of Equation 11 is converted to the problem for maximizing the lower bound of the network-wide sum rate based on Equation 12 for the brevity.

$$C_0 \geq \qquad \text{[Eqn. 12]}$$

$$\log_2 \frac{\prod_k \left\{(w_0 c_0) \prod_{i \neq 0}(w_i c_i)\right\}}{\left(\frac{1}{K \times N_{cell}} \sum_k \left\{\left(\sum_{i \neq 0} \binom{w_i a_{0i} +}{w_0 a_{i0}} P_i^k + \right) P_o^k\right\}\right)^{K \times N_{cell}}}$$

In Equation 12, $C_o$ denotes the network-wide sum rate, $w_0$ denotes the impact factor of the reference cell, $c_0$ denotes the target signal strength of the reference cell, $w_i$ denotes the impact factor of the $BS_i$, $c_i$ denotes the target signal strength of the i-th neighboring cell, K denotes the number of the resource blocks, $N_{cell}$ denotes the number of cells, $N_0$ denotes the noise power of the reference cell, $P_0^k$ denotes the transmit power of the $BS_0$ for the k-th resource block, $P_i^k$ denotes the transmit power of the $BS_i$ for the k-th resource block, $I_i$ denotes the sum of noise power of the i-th neighboring cell and noise powers of the cells than other the reference cell, $a_{0i}$ and $b_{oi}$, which are constants indicating characteristics of the linear approximate function of the long-term channel gain based on the transmit power between the UE of the reference cell and the $BS_i$, denote the slope and the y-intercept of the linear approximate function, and $a_{i0}$ and $b_{i0}$, which are constants indicating characteristics of the linear approximate function of the long-term channel gain based on the transmit power between the $UE^m{}_i$ and the $BS_0$, denote the slope and the y-intercept of the linear approximate function.

The right side of Equation 12 is maximized when it satisfies a condition of Equation 13.

$$\left\{ \sum_{i \neq 0} (w_i a_{0i} + w_0 a_{i0}) P_i^k + w_o b_{i0} \right\} \leq \qquad \text{[Eqn. 13]}$$

$$\left\{ \sum_{i \neq 0} (w_i a_{0i} + w_0 a_{i0}) P_i^j + w_o b_{i0} \right\} \leftrightarrow P_i^k \geq P_i^j, \quad \forall k \neq j$$

In Equation 13, $w_0$ denotes the impact factor of the reference cell, $w_i$ denotes the impact factor of the $BS_i$, $P_0^k$ denotes the transmit power of the $BS_0$ for the k-th resource block, $P_i^k$ denotes the transmit power of the $BS_i$ for the k-th resource block, $a_{0i}$ and $b_{oi}$, which are the constants indicating characteristics of the linear approximate function of the long-term channel gain based on the transmit power between the UE of the reference cell and the $BS_i$, denote the slope and the y-intercept of the linear approximate function, and $a_{i0}$ and $b_{i0}$, which are the constants indicating characteristics of the linear approximate function of the long-term channel gain based on the transmit power between the $UE^m{}_i$ and the $BS_0$, denote the slope and the y-intercept of the linear approximate function.

As a result, the power allocation in the second step determines the interference indices per resource block based on Equation 14 and allocates the greater transmit power with respect to the smaller interference index.

$$\xi_k = \sum_{i \neq 0} (w_i a_{oi} + w_0 a_{i0}) P_i^k + w_0 b_{i0} \qquad \text{[Eqn. 14]}$$

In Equation 14, $\xi_k$ denotes an interference index for the k-th resource block, $w_0$ denotes the impact factor of the reference cell, $w_i$ denotes the impact factor of the $BS_i$, $P_i^k$ denotes the transmit power of the $BS_i$ for the k-th resource block, $a_{0i}$, which is the constant indicating characteristics of the linear approximate function of the long-term channel gain based on the transmit power between the UE of the reference cell and the $BS_i$, denotes the slope of the linear approximate function, and $a_{i0}$ and $b_{i0}$, which are the constants indicating characteristics of the linear approximate function of the long-term channel gain based on the transmit power between the $UE^m{}_i$ and the $BS_0$, denote the slope and the y-intercept of the linear approximate function.

Equation 14 includes the impact factor. The impact factor is defined per cell and indicates significance of the interference from the corresponding cell and the interference exerted on the corresponding cell. Determinants of the impact factor can include loading of the corresponding cell, RNTP update history, and so on. For example, when a number of users are connected to the i-th cell and the loading is considerable, the i-th cell can have difficulty assisting with the inter-cell interference control or be more sensitive to the interference from the other cell. Hence, the i-th cell should be assigned the greater impact factor. According to Equation 14, a greater impact factor corresponds to a relatively greater interference index. Naturally, the relatively low transmit power is allocated to the corresponding resource block. When the update of the RNTP information is determined by statistically examining the RNTP update of the i-th cell, it is predicted that the interference from the i-th cell or the interference exerted on the i-th cell will greatly change in a little while, because the i-th cell newly sets the RNTP through the first step and the second step of the present invention. In this case, it is advantageous to reduce the influence of the i-th cell on the determination of the interference indices by setting the small impact factor of the i-th cell.

While Equation 14 represents an accurate expression according to an exemplary embodiment of the present invention, the formula for determining the interference indices can vary according to the path loss model and the geometric information. The variation based on the path loss model and the geometric information is reflected in the constant a and the constant b of Equation 14, and the constant a and the constant b are determined through the precise modeling and determination in the cell deployment. The constant a and the constant b can serve as weights. That is, the impact factor serves as a time-varying weight, and the constant a and the constant b serve as time-invariant weights determined in the cell deployment. Hence, although the constant a and the constant b are not accurately determined, it is irrelevant to the performance of the system but compromises the inter-cell fairness. In this case, a separate apparatus for managing the BSs, for example, a Self Organizing Network (SON) server of the 3GPP LTE system can compensate for the inaccuracy of the constant a and the constant b by regulating the impact factor of each cell.

Via the second step as stated above, the BS A 201 and the BS B 203 acquire the power constraint result per resource block as shown in FIG. 2B. Referring to FIG. 2B, the BS A 201 determines the power constraint of [3 3 3 3 1 5 5 5 4 4] in order with respect to the resource blocks, and accordingly the RNTP indicator bitmap is updated to {0, 0, 0, 0, 0, 1, 1, 1, 1, 1}. The BS B 203 determines the power constraint of [5 5 5 3 3 3 3 3 1 2] in order with respect to the resource blocks, and accordingly the RNTP indicator bit is updated to {1, 1, 1, 0, 0, 0, 0, 0, 0, 0}.

The third step allocates the resources to the UEs under the condition of the transmit power per resource block acquired in the second step. Namely, the third step addresses the single-cell OFDMA NUM by taking into account short-term channel gain information and QoS information under the condition of the resource block based transmit power. In the third step, the single-cell OFDMA NUM is addressed using the short-term channel information and the QoS based on Equation 15.

$$\text{Maximize} \sum_{m=1}^{M} \left[ U'(R_{t,opt}) \sum_k \left\{ \frac{B}{K} \log_2 \left( 1 + \frac{g_{m0} P^k}{N_0} \right) x_m^k \right\} \right] \qquad \text{[Eqn. 15]}$$

$$\sum_k P^k \leq P_{total}$$

$$P^k \geq 0$$

Subject to $P^k \leq P_0^k$ $$\sum_{m=1}^{M} x_m^k \leq 1$$

$$x_m^k \in \{0, 1\}$$

In Equation 15, M denotes the total number of UEs connected to the BS, $U'(R_{t,opt})$ denotes a differential function of the network utility including an optimum data rate vector at a time t, B denotes a bandwidth, K denotes the number of the resource blocks, $g_{m0}$ denotes a short-term channel gain between the $BS_0$ and the UE m, $P^k$ denotes the transmit power of the BS for the k-th resource block, $x_m^k$, which indicates whether the k-th resource block is allocated to the UE m, denotes a variable that is set to 1 when the k-th resource block is allocated and that is set to 0 when the k-th resource block is not allocated, and $P_{total}$ denotes the total transmit power of the BS.

Via the third step, the transmit power allocation and resource allocation for the resource blocks is carried out by reflecting the result of the second step. As a result, the BS A 201 and the BS B 203 obtain the power and resource allocation results as shown in FIG. 2B.

Now, exemplary operations and structures of a BS for managing a resource as mentioned above are elucidated by referring to the drawings.

Figure 4:
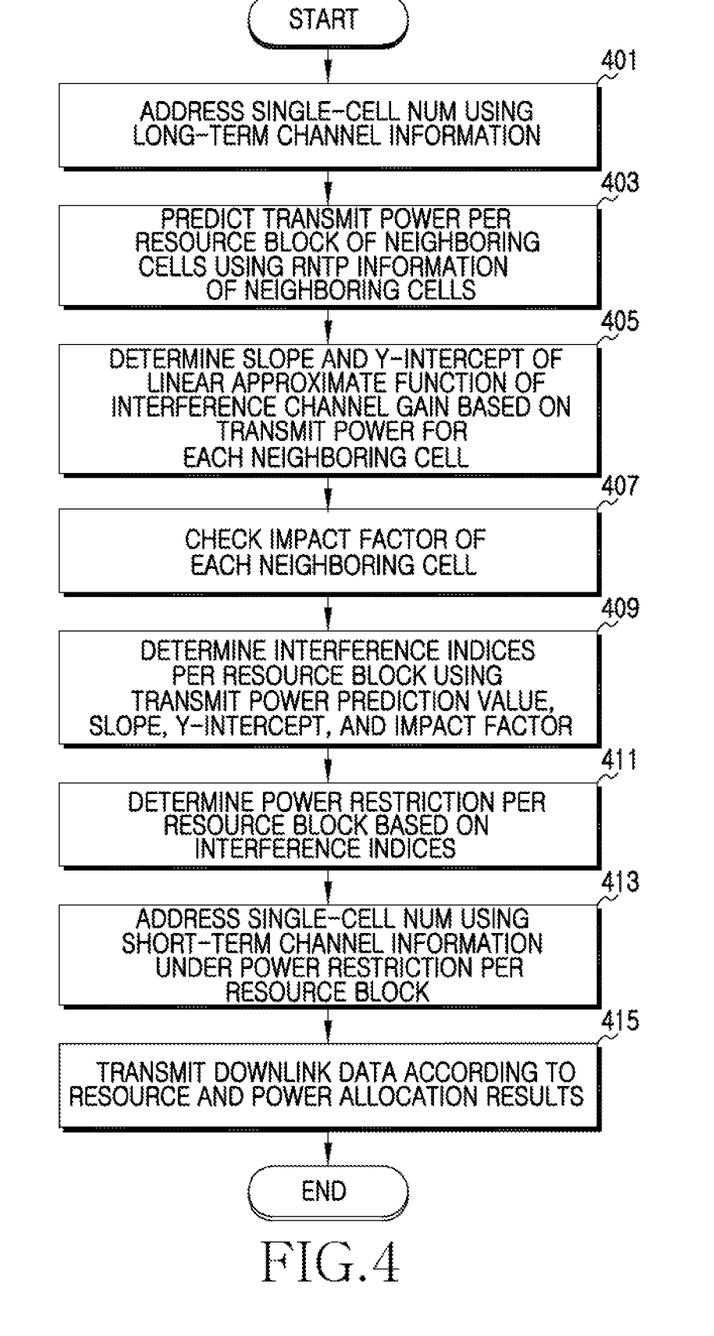
FIG. 4 illustrates operations of a base station in a broadband wireless communication system according to an exemplary embodiment of the present invention.

FIG. 4 illustrates operations of a BS in a broadband wireless communication system according to an exemplary embodiment of the present invention.

Referring to FIG. 4, in step 401, the BS addresses the single-cell NUM using the long-term channel information. More specifically, the BS allocates the resources and the transmit power to maximize the QoS satisfaction of the UEs and the sum rate using the long-term channel information of the UEs connected to the BS. For example, by addressing the optimization problem based on Equation 2, the BS allocates the resources and the transmit power. Herein, the long-term channel information indicates the channel quality observed in general. For example, the long-term channel information can use an average value of the channel quality measured in the short term. The channel quality measured in the short term is fed back from the UE or directly measured using a sounding signal. While the BS attains the allocation results of the resource and the transmit power in step 401, the resource allocation result is discarded, the allocation details of the transmit power allocation result are excluded, and only the power distribution is utilized. Herein, the power distribution indicates the number distribution of the resource blocks assigned the transmit value.

In step 403, the BS predicts the resource block based transmit power of the neighboring cells using the RNTP information provided from the neighboring cells. The prediction value of the transmit power is one of the maximum transmit power value of the RNTP threshold of the corresponding cell. That is, in the indicator bitmap of the RNTP information, the transmit power of the resource block exceeding the RNTP threshold is predicted as the maximum transmit power value, and the transmit power value of the resource block less than or equal to the RNTP threshold is predicated as the RNTP threshold.

In step 405, the BS determines the slope and the y-intercept of the linear approximate function of the interference channel gain based on the transmit power for the neighbor cells. Herein, the interference channel gain indicates the channel gain between the BS and the UEs of each neighboring cell. The transmit power indicates the transmit power of the BS of the neighboring cell. The function of the interference channel gain based on the transmit power is constituted with a channel gain initial value β and an attenuation index α based on the distance between the BSs and the channel model, and is an exponential function including the distance between the BS and the UE as a variable. The distance between the BS and the UE is converted to a function relating to the transmit power. For example, the function is given by Equation 9, and can be expressed as Equation 10 as the linear approximate function in order to reduce the computation complexity. In Equation 10, $a_{i0}$ is the slope value and $b_{i0}$ is the y-intercept. The slope value and the y-intercept are determined in the cell deployment. The BS pre-stores the slope value and the y-intercept with respect to the neighboring cells, and fetches them in step 405 for the subsequent operation.

In step 407, the BS determines the impact factor of each neighboring cell. The impact factor is the weight indicating the significance of the interference from the corresponding cell and the interference exerted on the corresponding cell. The determinants of the impact factor can include the loading of the corresponding cell and the RNTP update history. In other words, separately from the present process, the BS continuously manages the impact factor of each neighboring cell by taking account of the loading of the neighboring cell and the RNTP update history of the neighboring cell, and fetches them in step 407 for the subsequent operation. Yet, in other various exemplary embodiments, the BS can receive the impact factor of each neighboring cell from the SON server which manages the BSs, rather than directly managing the impact factors.

In step 409, the BS determines the interference indices per resource block using the transmit power prediction value, the slope, the y-intercept, and the impact factor. The interference index indicates the sum of the interference on the cell of the BS from the neighboring cell and the interference on the neighboring cell from the cell of the BS, and is expressed as one value per resource block. For example, the BS determines the interference indices per resource block based on Equation 14. Notably, Equation 14 is an example for determining the interference indices. According to the intention of the practitioner of the present invention, the equation can be partially modified without departing from the spirit and scope of the present invention.

In step 411, the BS determines the power constraint per resource block according to the interference indices. That is, the BS determines the power constraint per resource block using the power distribution determined in step 401 and the interference indices per resource block. More specifically, the BS allocates the power constraint value to define the lower power constraint for the greater interference index. For doing so, the BS allocates the high power constraint value to the block of the great interference index in the descending order under the condition of the power distribution. That is, the power distribution is one set having the power value as its elements. The BS arranges the elements in the order of the value and then sequentially maps the blocks in the descending order of the interference index. As a result, the RNTP indicator bitmap of the BS is newly determined. The BS updates the RNTP indicator bitmap and simultaneously transmits the updated RNTP information to the neighboring BSs, or transmits the updated RNTP information by predefined transmission periods.

In step 413, the BS addresses the single-cell NUM using the short-term channel information under the condition of the power constraint per resource block. That is, without violating the power constraint per resource block, the BS allocates the resource and the transmit power to maximize the QoS satisfaction of the UEs and the sum rate using the short-term channel information of the UEs connected to the BS. For example, the BS allocates the resource and the transmit power by addressing the optimization based on Equation 15. Herein, the short-term channel information indicates the channel quality, and is fed back from the UE or measured directly using the sounding signal.

In step 415, the BS transmits downlink data according to the resource and power allocation results. In more detail, the BS generates transmit signals by encoding and modulating downlink data to the UEs assigned the resource, maps the transmit signals to the resource blocks, regulates the signal size according to the power value assigned to the resource blocks, constitutes OFDM symbols through Inverse Fast Fourier Transform (IFFT) operation and Cyclic Prefix (CP) insertion, and then transmits the OFDM symbols over an antenna.

Figure 5:
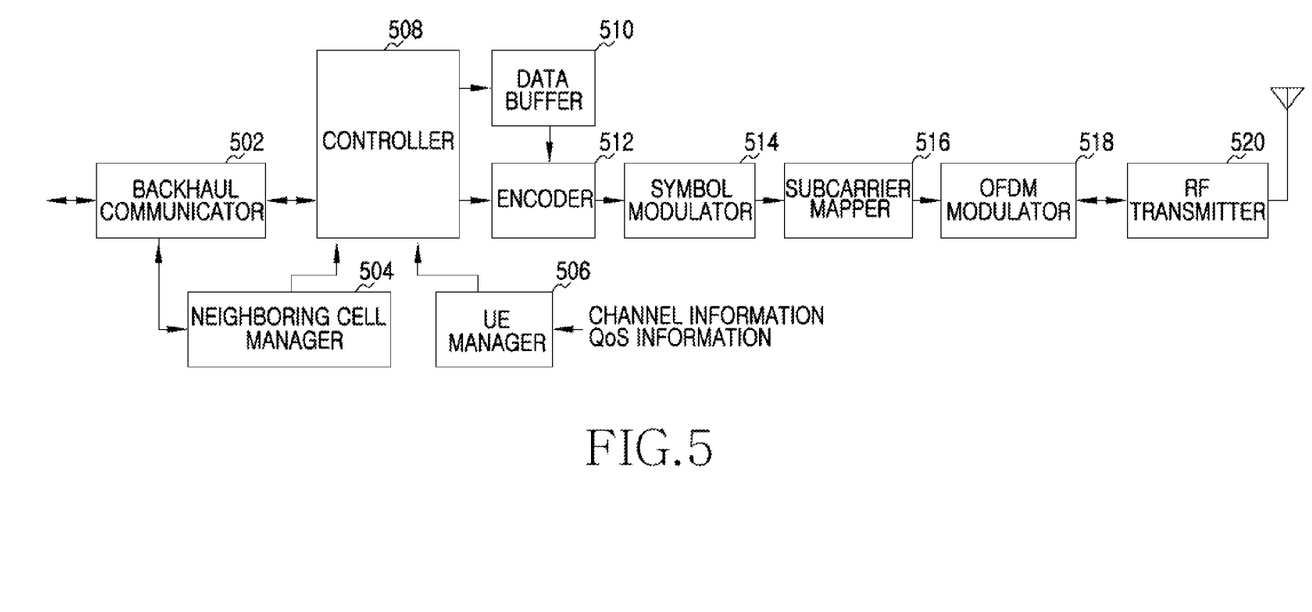
FIG. 5 is a block diagram of a base station in a broadband wireless communication system according to an exemplary embodiment of the present invention.

FIG. 5 is a block diagram of a BS in a broadband wireless communication system according to an exemplary embodiment of the present invention.

Referring to FIG. 5, the BS includes a backhaul communicator 502, a neighboring cell manager 504, a UE manager 506, a controller 508, a data buffer 510, an encoder 512, a symbol modulator 514, a subcarrier mapper 516, an OFDM modulator 518, and a Radio Frequency (RF) transmitter 520.

The backhaul communicator 502 provides an interface for communicating with a neighboring BS and an SON server over a backhaul network. The backhaul communicator 502 converts transmit data provided from the controller 508 or the neighboring cell manager 504 to a physical signal and transmits the physical signal to the neighboring BS or the SON server over the backhaul network. The backhaul communicator 502 converts a physical signal received from the neighboring BS or the SON server to data and outputs the data to the controller 508 or the neighboring cell manager 504. More particularly, the backhaul communicator 502 provides the RNTP information received from the neighboring BSs to the neighboring cell manager 504, and transmits the RNTP information of the BS output from the neighboring cell manager 504 to the neighboring BSs.

The neighboring cell manager 504 stores and updates information of the neighboring cells, and provides the stored information according to the request of the controller 508. Herein, the information of the neighboring cells includes the RNTP information of the neighboring BSs, the update history of the RNTP information, the loading of the neighboring cells, the impact factors of the neighboring cells, and the slope and the y-intercept of the linear approximate function of the interference channel gain based on the transmit power for the neighboring cells. Herein, the impact factors of the neighboring cells are determined directly by the neighboring cell manager 504 or received from the outside via the backhaul communicator 502. The slope and the y-intercept of the linear approximate function are determined in the cell deployment. The slope and the y-intercept of the linear approximate function are not updated unless the cell configuration changes, and if ever, is updated by a system designer.

The UE manager 506 stores and updates information of the UEs connected to the BS, and provides the stored information according to the request of the controller 508. Herein, the information of the UEs may include short-term downlink channel quality, long-term downlink channel quality, and required QoS information of the UEs. The long-term channel information indicates the channel quality observed in general, and can use, for example, the average value of the channel quality measured in the short term. The channel quality measured in the short term is fed back from the UE or measured directly using the sounding signal.

The controller 508 controls the functions of the BS. The controller 508 controls the functions for data transmission and reception, access management of the UEs, and scheduling. More particularly, the controller 508 conducts the three-step resource management function using the RNTP information of the neighboring BSs. More specifically, in the first step, the controller 508 addresses the single-cell NUM using the long-term channel information stored to the UE manager 506. Using the long-term channel information of the UEs connected to the BS, the controller 508 allocates the resource and the transmit power to maximize the QoS satisfaction of the UEs and the sum rate. For example, the controller 508 allocates the resource and the transmit power by addressing the optimization based on Equation 2. While the controller 508 can acquire the allocation results of the resource and the transmit power via the first step, the resource allocation result is discarded, the details of the transmit power allocation result are excluded, and only the power distribution is used for the second step. Herein, the power distribution indicates the number distribution of the resource blocks assigned the transmit power.

In the second step, the controller 508 predicts the transmit power per resource block of the neighboring cells using the RNTP information of the neighboring BSs stored to the neighboring cell manager 504. The prediction value of the transmit power is one of the maximum transmit power value or the RNTP threshold of the corresponding cell. In the indicator bitmap of the RNTP information, the transmit power value of the resource block greater than the RNTP threshold is predicted as the maximum transmit power value, and the transmit power value of the resource block less than or equal to the RNTP threshold is predicted as the RNTP threshold. After predicting the transmit power, the controller 508 requests the slope and the y-intercept of the linear approximate function of the interference channel gain based on the transmit power for each neighboring cell and the impact factors of the neighboring cells, to the neighboring cell manager 504, and determines the interference indices per resource block using the transmit power prediction value, the slope, the y-intercept, and the impact factor. The interference index indicates the sum of the interference on the cell of the BS from the neighboring cell and the interference on the neighboring cell from the cell of the BS, and is expressed as one value per resource block. For example, the controller 508 determines the interference indices per resource block based on Equation 14. Yet, Equation 14 is explained as an example for the interference index determination, and can be partially modified within the spirit and the scope of the present invention according to the intention of the practitioner. After determining the interference indices per resource blocks, the controller 508 determines the power constraint per resource block based on the interference indices. In further detail, the controller 508 allocates the power constraint value to set the lower power constraint for the greater interference index. For doing so, the controller 508 allocates the high power constraint value in the descending block order of the interference index under the condition of the power distribution. That is, the power distribution is one set including the power values as its elements. The controller 508 arranges the elements in the order of the value and sequentially maps the blocks in the descending order of the interference index.

In the third step, the controller 508 addresses the single-cell NUM using the short-term channel information stored to the UE manager 506 under the condition of the power constraint per resource block. Without violating the power constraint per resource block, the controller 508 allocates the resource and the transmit power to maximize the QoS satisfaction of the UEs and the sum rate using the short-term channel information of the UEs connected to the BS. For example, the controller 508 allocates the resource and the transmit power by addressing the optimization of Equation 15.

According to the resource allocation result of the controller 508, the data buffer 510 outputs the transmit data for the UE assigned the resource. The encoder 512 encodes the transmit data output from the data buffer 510. The symbol modulator 514 modulates the data encoded by the encoder 512 to complex symbols. The subcarrier mapper 516 maps the complex symbols to the resource blocks according to the resource allocation result of the controller 508. The subcarrier mapper 516 regulates the signal size mapped to the resource blocks based on the power allocation result of the controller 508. The OFDM modulator 518 applies the IFFT to the mapped complex symbols and constitutes the OFDM symbols by inserting the CP. The RF transmitter 520 up-converts the OFDM symbols to an RF signal and then transmits the RF signal over the antenna.

According to exemplary embodiments of the present invention, the computation for reducing the inter-cell interference is dispersed to the BSs using the RNTP. Therefore, the inter-cell interference is suppressed with the low computational complexity. Since the inter-cell interference reduction is applied to the entire communication band without distinction of the UE in the cell boundary and the UE in the center of the cell, additional scheduling gain is attained.

While the invention has been shown and described with reference to certain exemplary embodiments thereof, it will be understood by those skilled in the art that various changes in form and details may be made therein with departing from the spirit and scope of the invention as defined by the appended claims and their equivalents.

What is claimed is:

1. A resource managing method of a Base Station (BS) in a wireless communication system, the method comprising:
   allocating, by the BS, resources and transmit power to maximize Quality of Service (QoS) satisfaction of User Equipments (UEs) and a sum rate using long-term channel information of the UEs;
   determining, by the BS, a transmit power constraint per resource block using a power distribution of the resources and transmit power allocation results and control information of at least one neighboring BS; and
   allocating, by the BS, resources and transmit power to maximize the QoS satisfaction of the UEs and the sum rate using short-term channel information of the UEs under a condition of the transmit power constraint.

2. The method of claim 1, wherein the determining of the transmit power constraint per resource block comprises:
   predicting the transmit power per resource block of the at least one neighboring BS using the control information of the at least one neighboring BS.

3. The method of claim 2, wherein the control information comprises an indicator bitmap indicating whether the transmit power per resource block of the at least one neighboring BS is greater than or less than a Relative Narrowband Transmit Power (RNTP) threshold of the at least one neighboring BS.

4. The method of claim 3, wherein the predicting of the transmit power per resource block comprises:
   predicting a transmit power value of the resource block greater than the RNTP threshold in the indicator bitmap, as a maximum transmit power value; and
   predicting a transmit power value of the resource block less than the RNTP threshold in the indicator bitmap, as the RNTP threshold.

5. The method of claim 2, wherein the determining of the transmit power constraint per resource block comprises:
   determining interference indices indicating a sum of interference on a cell of the BS from a neighboring cell and interference on a neighboring cell from the cell of the BS.

6. The method of claim 5, wherein the interference indices are determined using at least one of the transmit power prediction value, a slope and a y-intercept of a linear approximate function of an interference channel gain based on the transmit power of each neighboring cell, and impact factors which are weights indicative of a significance of interference from each neighboring cell and interference on each neighboring cell.

7. The method of claim 6, wherein the interference indices are determined based on the following equation:

$$\xi_k = \sum_{i \neq 0}(w_i a_{oi} + w_0 a_{i0})P_i^k + w_0 b_{i0}$$

where $\xi_k$ denotes an interference index for a k-th resource block, $w_0$ denotes an impact factor of a reference cell, $w_i$ denotes an impact factor of an i-th neighboring BS, $P_i^k$ denotes a transmit power of the i-th neighboring BS for the k-th resource block, $a_{0i}$, which is a constant indicating characteristics of the linear approximate function of a long-term channel gain based on the transmit power between a UE of the reference cell and the i-th neighboring BS, denotes the slope of the linear approximate function, and $a_{i0}$ and $b_{i0}$, which are constants indicating characteristics of a linear approximate function of the long-term channel gain based on the transmit power between a UE of an i-th neighboring cell and the BS, denote a slope and a y-intercept of the linear approximate function.

8. The method of claim 5, wherein the determining of the transmit power constraint per resource block comprises:
   determining the power constraint per resource block using the power distribution and the interference indices per resource block.

9. The method of claim 8, wherein the determining of the transmit power constraint per resource block comprises:
   assigning a high power constraint value in a descending block order of the interference index under a condition of the power distribution.

10. The method of claim 1, wherein the allocating of the resources and transmit power to maximize the QoS satisfaction of the UEs is based on the following equation:

$$\text{maximize} \sum_{m=1}^{M}\left[U'(R_{t,opt})\sum_{k}\left\{\frac{B}{K}\log_2\left(1+\frac{g_{m0}P^k}{N_0}\right)x_m^k\right\}\right]$$

$$\sum_{k} P^k \leq P_{total}$$

$$P^k \geq 0$$

subject to $P^k \leq P_0^k$ $$\sum_{m=1}^{M} x_m^k \leq 1$$

$$x_m^k \in \{0, 1\}$$

where M denotes a total number of UEs connected to the BS, $U'(R_{t,opt})$ denotes a differential function of the network utility including an optimum data rate vector at a time t, B denotes a bandwidth, K denotes a number of the resource blocks, $g_{m0}$ denotes a short-term channel gain between the $BS_0$ and the UE m, $P^k$ denotes the transmit power of the BS for the k-th resource block, $x_m^k$, which indicates whether the k-th resource block is allocated to the UE m, denotes a variable that is set to 1 when the k-th resource block is allocated and that is set to 0 when the k-th resource block is not allocated, and $P_{total}$ denotes the total transmit power of the BS.

11. The method of claim 1, further comprising:
generating transmit signals by encoding and modulating downlink data to UEs assigned the resources;
mapping the transmit signals to the resource blocks according to the resource allocation result;
regulating a signal size mapped to the resource blocks according to the power allocation result;
constituting Orthogonal Frequency Division Multiplexing (OFDM) symbols using Inverse Fast Fourier Transform (IFFT) and Cyclic Prefix (CP) insertion; and
transmitting the OFDM symbols.

12. An apparatus of a Base Station (BS) in a wireless communication system, comprising:
a User Equipment (UE) manager for storing long-term channel information and short-term channel information of UEs; and
a controller for allocating resources and transmit power to maximize Quality of Service (QoS) satisfaction of the UEs and a sum rate using the long-term channel information of the UEs, for determining a transmit power constraint per resource block using a power distribution of the resources and transmit power allocation results and control information of at least one neighboring BS, and for allocating resources and transmit power to maximize the QoS satisfaction of the UEs and the sum rate using the short-term channel information of the UEs under a condition of the transmit power constraint.

13. The apparatus of claim 12, wherein the controller predicts the transmit power per resource block of the at least one neighboring BS using the control information of the at least one neighboring BS.

14. The apparatus of claim 13, wherein the control information comprises an indicator bitmap indicating whether the transmit power per resource block of the at least one neighboring BS is greater than or less than a Relative Narrowband Transmit Power (RNTP) threshold of the at least one neighboring BS.

15. The apparatus of claim 14, wherein the controller predicts a transmit power value of the resource block greater than the RNTP threshold in the indicator bitmap, as a maximum transmit power value, and predicts a transmit power value of the resource block less than the RNTP threshold in the indicator bitmap, as the RNTP threshold.

16. The apparatus of claim 13, wherein the controller determines interference indices indicating a sum of interference on a cell of the BS from a neighboring cell and interference on a neighboring cell from the cell of the BS.

17. The apparatus of claim 16, wherein the interference indices are determined using at least one of the transmit power prediction value, a slope and a y-intercept of a linear approximate function of an interference channel gain based on the transmit power of each neighboring cell, and impact factors which are weights indicative of a significance of interference from each neighboring cell and interference on each neighboring cell.

18. The apparatus of claim 17, wherein the interference indices are determined based on the following equation:

$$\xi_k = \sum_{i \neq 0} (w_i a_{oi} + w_0 a_{i0}) P_i^k + w_0 b_{i0}$$

where $\xi_k$ denotes an interference index for a k-th resource block, $w_0$ denotes an impact factor of a reference cell, $w_i$ denotes an impact factor of an i-th neighboring BS, $P_i^k$ denotes a transmit power of the i-th neighboring BS for the k-th resource block, $a_{0i}$, which is a constant indicating characteristics of the linear approximate function of a long-term channel gain based on the transmit power between a UE of the reference cell and the i-th neighboring BS, denotes the slope of the linear approximate function, and $a_{i0}$ and $b_{i0}$, which are constants indicating characteristics of a linear approximate function of the long-term channel gain based on the transmit power between an UE of an i-th neighboring cell and the BS, denote a slope and a y-intercept of the linear approximate function.

19. The apparatus of claim 16, wherein the controller determines the power constraint per resource block using the power distribution and the interference indices per resource block.

20. The apparatus of claim 19, wherein the controller assigns a high power constraint value in a descending block order of the interference index under a condition of the power distribution.

21. The apparatus of claim 12, wherein the controller allocates the resources and transmit power to maximize the QoS satisfaction of the UEs based on the following equation:

$$\text{maximize} \sum_{m=1}^{M} \left[ U'(R_{t,opt}) \sum_{k} \left\{ \frac{B}{K} \log_2 \left( 1 + \frac{g_{m0} P^k}{N_0} \right) x_m^k \right\} \right]$$

$$\sum_{k} P^k \leq P_{total}$$

$$P^k \geq 0$$

subject to $P^k \leq P_0^k$ $$\sum_{m=1}^{M} x_m^k \leq 1$$

$$x_m^k \in \{0, 1\}$$

where M denotes a total number of UEs connected to the BS, $U'(R_{t,opt})$ denotes a differential function of the network utility including an optimum data rate vector at a time t, B denotes a bandwidth, K denotes a number of the resource blocks, $g_{m0}$ denotes a short-term channel gain between the $BS_0$ and the UE m, $P^k$ denotes the transmit power of the BS for the k-th resource block, $x_m^k$, which indicates whether the k-th resource block is allocated to the UE m, denotes a variable that is set to 1 when the k-th resource block is allocated and that is set to 0 when the k-th resource block is not allocated, and $P_{total}$ denotes the total transmit power of the BS.

22. The apparatus of claim 12, further comprising:
an encoder and a symbol modulator for generating transmit signals by encoding and modulating downlink data to the UEs assigned the resources;
a mapper for mapping the transmit signals to the resource blocks according to the resource allocation result, and regulating a signal size mapped to the resource blocks according to the power allocation result;
an Orthogonal Frequency Division Multiplexing (OFDM) modulator for constituting OFDM symbols using Inverse Fast Fourier Transform (IFFT) and Cyclic Prefix (CP) insertion; and
a transmitter for transmitting the OFDM symbols.

* * * * *